United States Patent
Nakaya

[11] Patent Number: 5,699,465
[45] Date of Patent: Dec. 16, 1997

[54] POLARIZATION INDEPENDENT BRANCHED OPTICAL WAVEGUIDE SWITCH

[75] Inventor: Ken-Ichi Nakaya, Tokyo, Japan

[73] Assignee: NEC Corporation, Tokyo, Japan

[21] Appl. No.: 718,292

[22] Filed: Sep. 20, 1996

Related U.S. Application Data

[63] Continuation of Ser. No. 447,419, May 24, 1995, abandoned.

[30] Foreign Application Priority Data

May 25, 1994 [JP] Japan .................. 6-110655

[51] Int. Cl.⁶ .................................. G02B 6/26
[52] U.S. Cl. ............................. 385/41; 385/16
[58] Field of Search ..................... 385/15, 16, 17, 385/22, 21, 39, 41, 50, 45, 8, 9, 11

[56] References Cited

U.S. PATENT DOCUMENTS

| | | | |
|---|---|---|---|
| 4,262,992 | 4/1981 | Berthold, III | 385/15 |
| 4,679,893 | 7/1987 | Ramer | 385/16 X |
| 5,050,947 | 9/1991 | Kawashima et al. | 385/41 X |
| 5,103,491 | 4/1992 | Kuzuta | 385/41 X |
| 5,189,713 | 2/1993 | Shaw | 385/2 |
| 5,202,941 | 4/1993 | Granestrand | 385/41 |
| 5,247,382 | 9/1993 | Suzuki | 359/156 |
| 5,263,102 | 11/1993 | Hakogi | 385/2 |
| 5,287,335 | 2/1994 | Ichiyama | 369/13 |
| 5,303,315 | 4/1994 | Granestrand | 385/16 |
| 5,373,393 | 12/1994 | DeJule et al. | 359/320 |
| 5,375,180 | 12/1994 | Murphy | 385/16 X |
| 5,483,608 | 1/1996 | Yokomachi et al. | 385/12 |
| 5,574,289 | 11/1996 | Aoki et al. | 257/17 |

FOREIGN PATENT DOCUMENTS 3-125797 of 1991 Japan .
3-990336 of 1991 Japan .

*Primary Examiner*—Akm E. Ullah
*Attorney, Agent, or Firm*—Scully, Scott, Murphy & Presser

[57] ABSTRACT

A waveguide type optical switch comprises a substrate having an electro-optical effect, a directional coupling type switch portion including two optical waveguides formed on the substrate for effecting optical switching by optical coupling. The waveguide switch includes a branched interfering portion provided on at least one of the two optical waveguides of the directional coupling switch portion, for controlling an intensity of light output from the directional coupling switch portion to obviate polarization dependency.

10 Claims, 3 Drawing Sheets

POLARIZATION INDEPENDENT BRANCHED OPTICAL WAVEGUIDE SWITCH

This application is a continuation of Ser. No. 08/447,419 filed on May 24, 1993 which is abandoned.

BACKGROUND OF THE INVENTION

The present invention relates to a waveguide type optical switch and, more particularly, to a waveguide type optical switch feasible for an optical communication system or similar system in which the polarization of input light is not constant.

In an optical communication system, for example, it is necessary to modulate light in accordance with an information signal to be sent and to switch or replace optical transmission paths. For the modulation of an information signal, there are available a direct modulation system and an external modulation system. The direct modulation system changes, in accordance with the signal, the current to be applied to a semiconductor laser, light emitting diode or similar light source. The external modulation system maintains the output light of a light source at a fixed level and causes an external device to modulate the light of constant level. Most of optical communication systems in operation today are implemented by the direct modulation system. However, with this type of system, it is difficult to effect high-speed modulation higher than several gigahertz (GHz) due to, for example, relaxation oscillation. Further, this type of system is not readily applicable to a coherent optical transmission system because the wavelength fluctuates. In light of this, the external modulation system, particularly one using a waveguide type modulator, is under study.

To switch or replace optical transmission paths, optical switches have customarily been implemented by prisms, mirrors or similar mechanically driven elements. However, these mechanically driven switches cannot switch transmission paths at high speed. Today, waveguide type optical switches are under study.

However, conventional waveguide type optical switches are not satisfactory because the intensity of light output therefrom changes depending on the polarization of input light.

SUMMARY OF THE INVENTION

It is, therefore, an object of the present invention to provide a waveguide type optical switch capable of outputting constant light without regard to the polarization of input light, and capable of being fabricated by a simple procedure.

In accordance with the present invention, a waveguide type optical switch has a substrate having an electro-optical effect, a directional coupling type switch portion formed on the substrate, and for effecting optical switching by optical coupling, and a branched interfering portion provided on one of two optical waveguides constituting the switch portion, and for controlling the intensity of light output from the switch portion.

Also, in accordance with the present invention, a waveguide type optical switch has a substrate having an electro-optical effect, a directional coupling type switch portion formed on the substrate, and for effecting optical switching by optical coupling, and a branched interfering portion provided on each of two optical waveguides constituting the switch portion, and for controlling the intensity of light output from the switch portion.

BRIEF DESCRIPTION OF THE DRAWINGS

The above and other objects, features and advantages of the present invention will become more apparent from the following detailed description taken with the accompanying drawings in which.

In the figures, the same or similar constituent parts are designated by the same reference numerals.

DESCRIPTION OF THE PREFERRED EMBODIMENT

Figure 1:
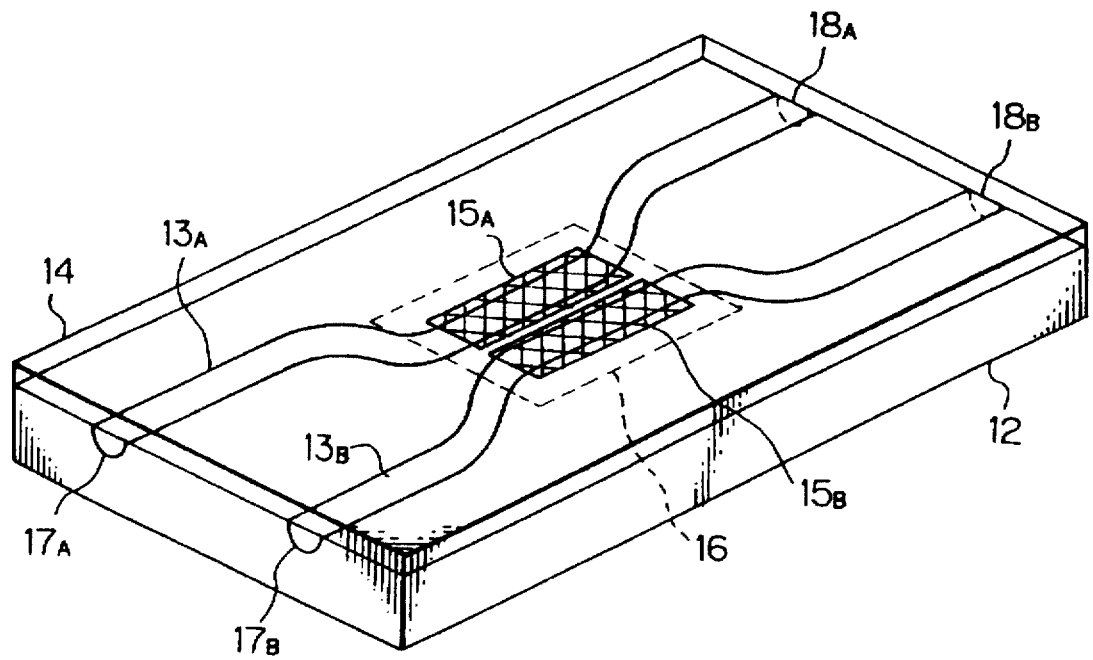
FIG. 1 is a perspective view of a conventional waveguide type optical switch.

To better understand the present invention, a brief reference will be made to a conventional waveguide type optical switch, shown in FIG. 1. As shown, the switch has a substrate 12 made of lithium niobate ($LiNbO_3$). Optical waveguides $13_A$ and $13_B$ are formed on the substrate 12 in a particular pattern, as illustrated. The waveguides $13_A$ and $13_B$ are slightly higher in refractive index than the substrate 12 and formed by thermally in-diffusing titanium (Ti) in the substrate 12. A buffer layer 14 is formed on the waveguides $13_A$ and $13_B$. The buffer layer 14 is implemented by silicon dioxide ($SiO_2$) by way of example. Control electrodes $15_A$ and $15_B$ are positioned on the buffer layer 14 where the waveguides $13_A$ and $13_B$ adjoin each other. This type of switch is sometimes referred to as a directional coupling type switch.

In the switch of the type described, a portion 16 where the waveguides 13A and 13B adjoin each other (directional coupling type switch portion) has a length preselected such that light entered the switch via an input port 17A leaves it via an output port 18B. This length is usually referred to as a complete coupling length. To guide the light from the input port 17A to an output port 18A, a predetermined voltage is applied to the control electrodes 15A and 15B.

Various research and development work for the high-density integration of waveguide type optical switches have been reported. For example, an 8×8 matrix optical switch consisting of sixty-four 2×2 directional coupling type switches is taught in "OQE88-147" of the Institute of Electronic Data Communication Engineers of Japan.

Usually, the coupling length or complete coupling length necessary for the perfect switching of light from one waveguide to the other waveguide differs from TE (Transverse Electric) mode light to TM (Transverse Magnetic) mode light. Specifically, assume that TE mode light and TM mode light having the same level are input to one waveguide of a directional coupling type switch having a given coupling length. Then, they each have a different intensity when output from the other waveguide of the switch.

In an optical communication system, the polarization state of light on a propagation path is generally not constant. Hence, a waveguide type switch for this kind of system should prevent the intensity of output light from being dependent on the polarization of input light as far as possible. Today, various technologies are available for preventing the switch from having insertion loss polarization dependency. One of them is to form waveguides under particular fabricating conditions such that complete coupling lengths for the two different modes of light are substantially equal to each other.

Figure 2:
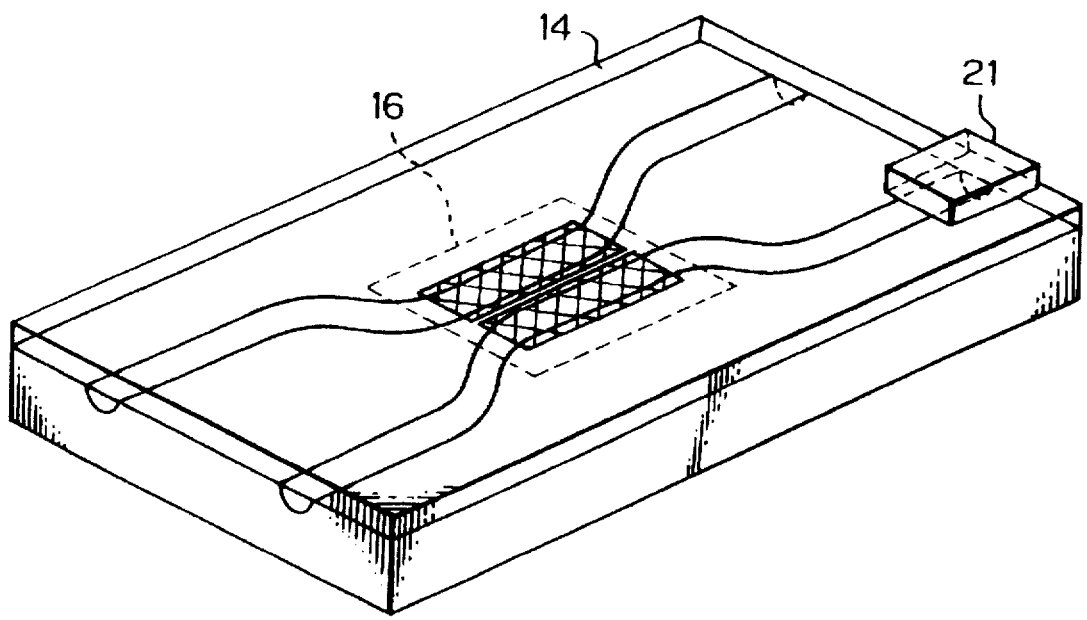
FIG. 2 is a perspective view of another conventional waveguide type optical switch having a TE mode absorbing film.

To reduce the above undesirable dependency, Japanese Patent Laid-Open Publication No. 3-99036 proposes an optical switch having a TE mode absorbing film on an optical waveguide. Specifically, as shown in FIG. 2, the switch is similar to a conventional switch except for a TE mode absorbing film 21. A directional coupling type switch portion 16 is so configured as to fully switch TE mode light from one waveguide to the other waveguide when no voltages are applied thereto. The size of the film 21 and the thickness of a buffer layer 14 are designed such that when light is propagated through the waveguide underlying the film 21, the film 21 absorbs only TE mode light by a predetermined ratio (ratio of cancelation of the dependency concerned). More specifically, when TE mode light is input to the switch, the switch portion 16 outputs light more intense than light resulting from TM mode light. However, because the film 21 attenuates the output light derived from the TE mode light, the light is of the same level as the light derived from the TM light when output from the switch.

Figure 3:
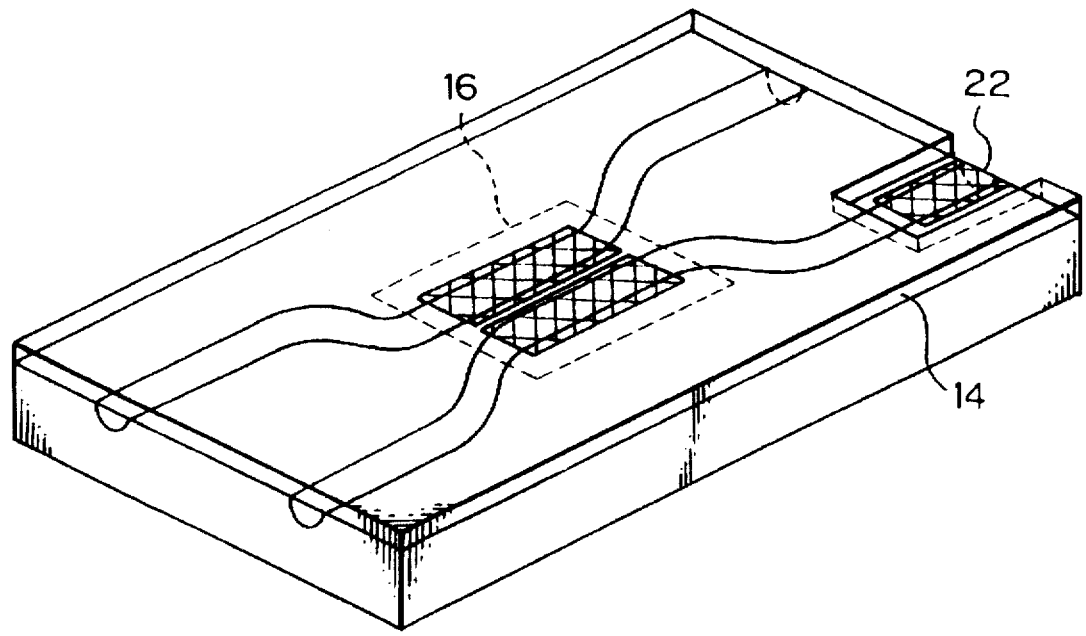
FIG. 3 is a perspective view of still another conventional waveguide type optical switch having a metal film.

On the other hand, Japanese Patent Laid-Open Publication No. 3-125797 discloses an optical switch having a metal film on an optical waveguide for absorbing TM mode light. Specifically, as shown in FIG. 3, part of a buffer layer 14 is removed, and a metal film 22 is received in the removed part of the layer 14. A directional coupling switch portion 16 is so configured as to fully switch TM mode light from one waveguide to the other waveguide. The metal layer 14 is provided with a particular length capable of canceling the dependency concerned and attributable to the switch portion 16.

With any of the above implementations, it is possible to reduce the insertion loss polarization dependency. However, when the substantial complete coupling lengths for TEM mode light and TM mode light are identical, the dependency is not avoidable due to the limited process control accuracy.

The TE mode absorbing film scheme of FIG. 2 has another problem that the thickness of the film 21 is not applicable to some optical switches. Even if this kind of scheme is practicable with any optical switch, the dependency concerned cannot be sufficiently reduced unless the thickness of the buffer layer 14 and that of the film 21 are controlled with high accuracy. As a result, laser etching or similar special processing is required which complicates the fabrication of the switch.

The metal film scheme of FIG. 3 also needs a complicated procedure for the fabrication of the switch because extra steps of removing the buffer layer 14 and positioning the metal film 22 of preselected the size in the removed portion of the layer 14 are necessary.

Of course, the TE mode absorbing film scheme is not practical for process reasons when the output intensity of TM mode light is increased. Likewise, the metal film scheme is not practical when the output intensity of TE mode light is increased.

Figure 4:
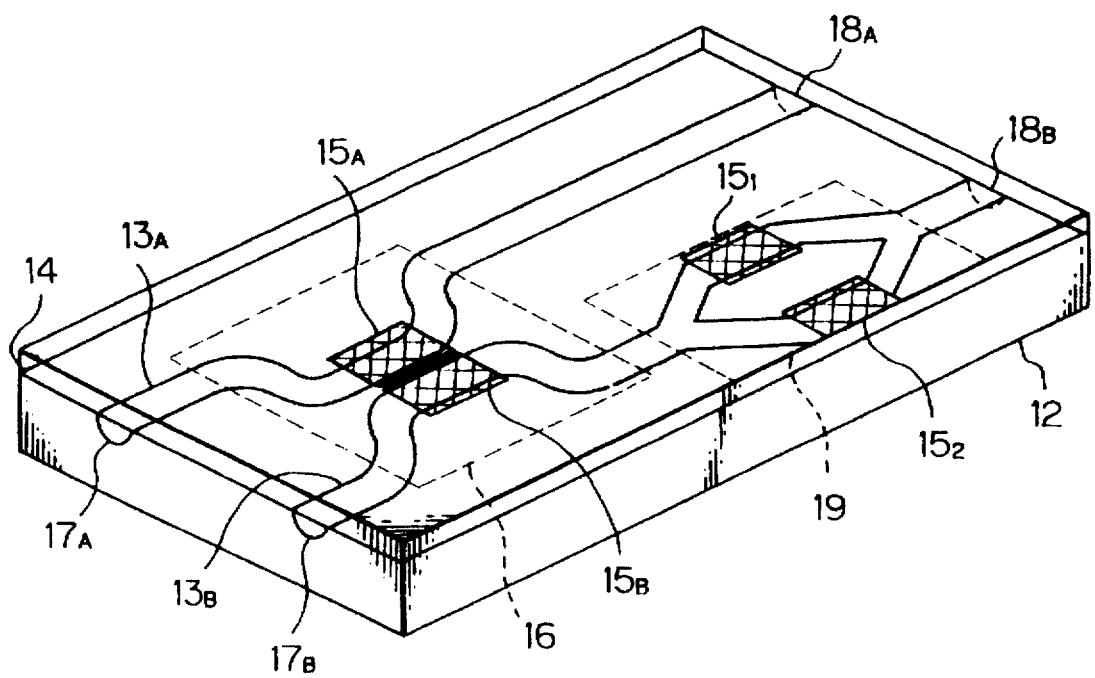
FIG. 4 is a perspective view of a waveguide type optical switch embodying the present invention.

Referring to FIG. 4, a waveguide type optical switch embodying the present invention will be described. As shown, the switch has a substrate 12 implemented by a Z-cut LiNbO$_3$ crystal. To form waveguides 13$_A$ and 13$_B$, a Ti film is formed on the substrate 12 in a predetermined pattern and then diffused in the substrate 12 by heat. An SiO$_2$ buffer layer 14 is formed on the waveguides 13$_A$ and 13$_B$. Control electrodes 15$_A$, 15$_B$, 15$_1$ and 15$_2$ are made of gold (Au) and located at predetermined positions on the buffer layer 14.

As shown, the two waveguides 13$_A$ and 13$_B$ constitute a directional coupling type switch portion 16 and a Machzenda type branched interfering portion 19. The switch portion 16 is designed and fabricated such that the complete coupling lengths for TE mode light and TM mode light are substantially equal to each other. The interfering portion 19 is provided only on one waveguide 13B. The embodiment reduces the insertion loss polarization dependency of the switch by using the dependency of the intensity of light output from the interfering portion 19 on the polarization of input light.

Figure 5:
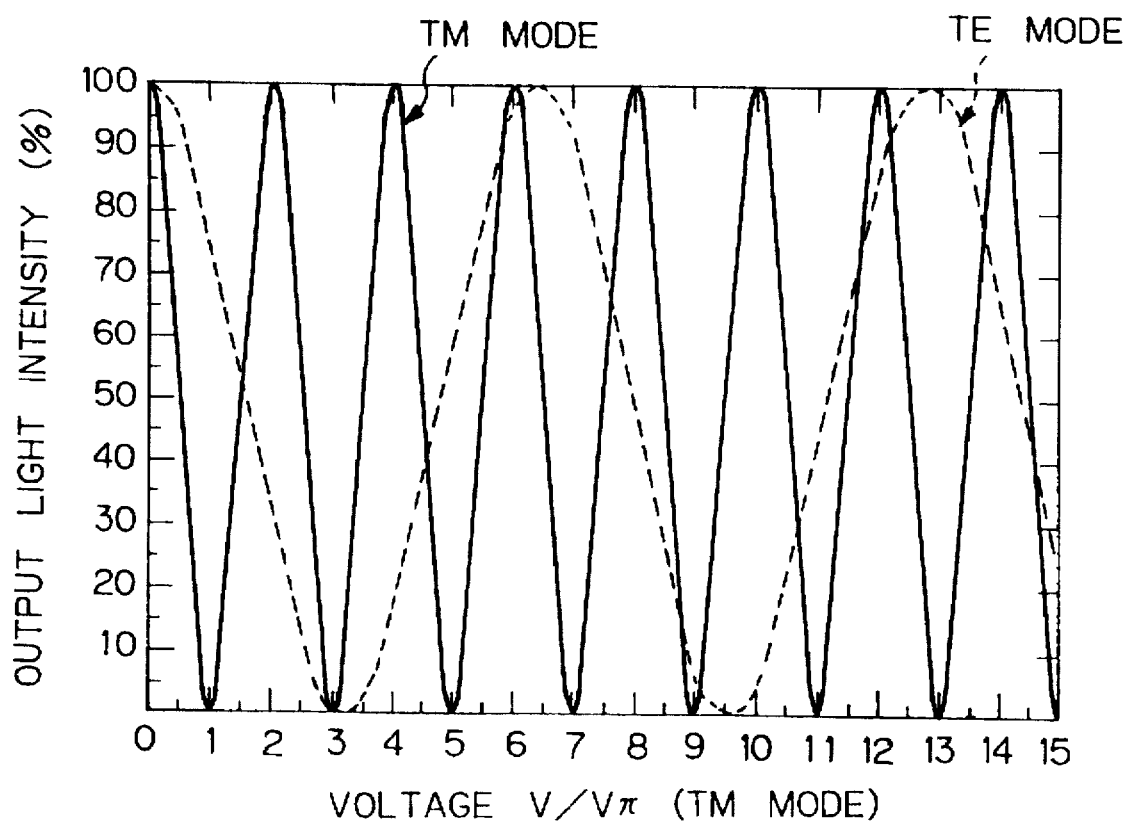
FIG. 5 shows a relation between a voltage and an output light intensity in a Machzenda branched interfering portion included in the embodiment with respect to TE mode light and TM mode light.

FIG. 5 shows a relation between a voltage and an output light intensity particular to the interfering portion 19 with respect to TE mode light and TM mode light. Values on the abscissa are representative of voltages applied "V" standardized by a half-wavelength voltage "V$\pi$" for TM mode light. The ordinate indicates the ratio of output light intensity to input light intensity in the interfering portion 19 in percentage. It will be seen that the relation depends on whether the input light is TE mode light or whether it is TM mode light, and that the output light intensity changes periodically in both of the modes. Hence, even when the output light intensity is determined for one mode, the intensity for the other mode is not unconditionally determined, but it is selectable. For example, when the output light intensity for TM mode light is selected to be 100%, the voltage "V" applied to the interfering portion 19 is limited to odd multiples of the half-wavelength voltage "V$\pi$". However, as FIG. 5 indicates, the intensity derived from TE mode light differs from one odd multiple to another odd multiple. Therefore, it is possible to select only necessary ones of such output light intensities.

Assume that the switch portion 16 shown in FIG. 4 is configured, due to an error in the process, such that a greater output light intensity results from TE mode input light than from TM mode input light. Then, to reduce the insertion loss polarization dependency, a voltage for increasing the intensity for TM mode light more than the intensity for TE mode light is applied to the interfering portion 19. Among such voltages, a particular voltage can fully eliminate the undesirable polarization dependency. Conversely, when the switch portion 16 is configured such that a greater output light intensity results from the TM mode light than from TE mode light, a particular voltage for increasing the intensity for TE mode light more than the intensity for TM mode light will be applied to obviate the dependency.

It is not necessary that the voltage applied to the interfering portion 19 increases one of the two output light intensities to 100%. For example, assume that when TE mode light should be attenuated to 80%, increasing the output intensity for TM mode light to 100% results in an excessively high voltage. Then, it is possible to select a voltage setting up an intensity of 90% for TM mode light and an intensity of 72% for TE mode light.

As stated above, even if the switch portion 16 does not exhibit the expected characteristic due to a defective process and has the insertion loss polarization dependency, the embodiment is capable of reducing the dependency to a desired degree. Moreover, the embodiment is practicable without adding any extra process to the conventional fabrication procedure. That is, it is only necessary to change the pattern of the material to be diffused and to increase the number of portions for locating control electrodes.

The embodiment is designed and fabricated such that the switch portion 16 has substantially the same complete coupling length for both of TE mode light and TM mode light. Alternatively, an arrangement may, of course, be made such that the complete coupling length holds for only one of the two modes, and the interfering portion 19 attenuates light of such one mode by a preselected ratio.

Figure 6:
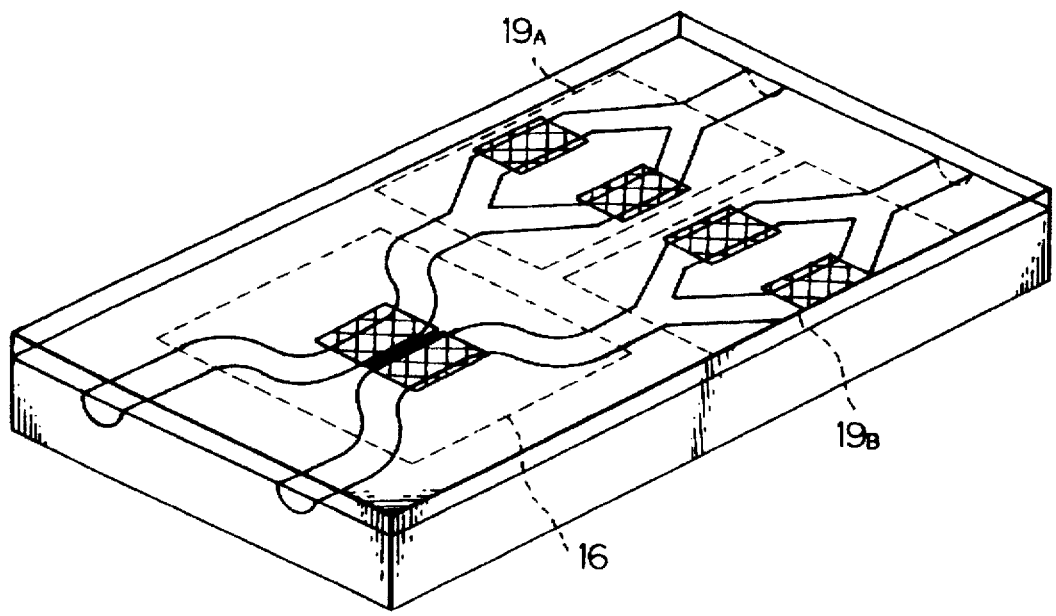
FIG. 6 is a perspective view showing a modification of the embodiment.

While the substrate 12 should preferably be made of LiNbO3 for characteristic reasons, it may be made any other suitable substance having an electro-optical effect, e.g., LiTaO3. Further, as shown in FIG. 6, interfering portions 10A and 19B may be provided on the two waveguides 13A and 13B, respectively.

In summary, it will be seen that the present invention provides a waveguide type optical switch capable of ensuring, even if a directional coupling type switch portion thereof has an insertion loss polarization dependency, constant output light without regard to the polarization of input light by controlling a voltage to be applied to a branched interfering portion. In addition, the switch of the invention does not need any process other than the conventional processes. The switch is, therefore, feasible for an optical communication system or similar system in which the polarization of input light is not constant.

Various modifications will become possible for those skilled in the art after receiving the teachings of the present disclosure without departing from the scope thereof.

What is claimed is:

1. A waveguide type optical switch comprising:
   a substrate having an electro-optical effect;
   a directional coupling type switch portion formed on said substrate, and for effecting optical switching by optical coupling; and
   a branched interfering portion provided on one of two optical waveguides constituting said directional coupling type switch portion, and for controlling an intensity of light output from said directional coupling type switch portion, wherein said branched interfering portion obviates polarization dependency.

2. A switch as claimed in claim 1, wherein said substrate is made of lithium niobate.

3. A switch as claimed in claim 1, wherein said substrate is made of lithium tantalate.

4. A waveguide type optical switch comprising:
   a substrate having an electro-optical effect;
   a directional coupling type switch portion formed on said substrate, and for effecting optical switching by optical coupling; and
   a branched interfering portion provided on each of two optical waveguides constituting said directional coupling type switch portion, and for controlling an intensity of light output from said directional coupling type switch portion, wherein said branched interfering portion obviates polarization dependency.

5. A switch as claimed in claim 4, wherein said substrate is made of lithium niobate.

6. A switch as claimed in claim 4, wherein said substrate is made of lithium tantalate.

7. A switch as claimed in claim 1, wherein said branched interfering portion comprises a Y branched portion.

8. A switch as claimed in claim 4, wherein said branched interfering portion comprises a Y branched portion.

9. A switch as claimed in claim 1, wherein said branched interfering portion obviates insertion loss polarization dependency of said directional coupling type switch.

10. A switch as claimed in claim 4, wherein said branched interfering portion obviates insertion loss polarization dependency of said directional coupling type switch.

* * * * *